(12) United States Patent
Harsola et al.

(10) Patent No.: US 12,536,167 B1
(45) Date of Patent: Jan. 27, 2026

(54) TRAINING OF IMPROVED MACHINE LEARNING MODEL FOR CONVERTING QUERIES TO A PROGRAMMING LANGUAGE

(71) Applicant: Intuit Inc., Mountain View, CA (US)

(72) Inventors: Shutendra Kirty Harsola, Bangalore (IN); Deepak Gujraniya, Bangalore (IN); Aniruddha Bardhan, Bengaluru (IN); Vikas Raturi, Bangalore (IN); Mohammad Saman Tamkeen, Bangalore (IN); Arkadeep Banerjee, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/195,577

(22) Filed: Apr. 30, 2025

(30) Foreign Application Priority Data

Apr. 25, 2025   (IN) .............................. 202541040075

(51) Int. Cl.
*G06F 17/28* (2006.01)
*G06F 16/2452* (2019.01)
(Continued)

(52) U.S. Cl.
CPC ...... *G06F 16/24522* (2019.01); *G06F 16/383* (2019.01)

(58) Field of Classification Search
CPC ........ G06N 20/00; G06N 3/0464; G06N 3/09; G06N 3/08; G06N 3/045; G06N 3/048; G06N 3/047; G06N 3/042; G06N 3/044; G06N 3/00; G06F 16/65; G06F 16/686; G06F 18/241; G06F 18/2411; G06F 16/24; G06F 16/24522; G06F 16/2452; G06F 16/38; G06F 16/383; G06F 16/245; G06F 16/2453; G06F 16/2455; G06F 16/24578; G06F 18/2113; G06F 40/284; G06F 16/3347; G06F 17/15; G06F 40/47; G06F 16/243

See application file for complete search history.

(56) References Cited

U.S. PATENT DOCUMENTS

| | | | |
|---|---|---|---|
| 2021/0406478 A1* | 12/2021 | Klein | G06N 3/045 |
| 2023/0169074 A1* | 6/2023 | Kim | G06F 40/247 |
| | | | 704/9 |

(Continued)

*Primary Examiner* — Michael Ortiz-Sanchez
(74) *Attorney, Agent, or Firm* — Lathrop GPM LLP

(57) ABSTRACT

A method including receiving a training dataset including instance data structures storing natural language queries in a domain-specific language. The domain-specific language includes predefined terms representable in a predefined data structure. The natural language queries corresponds to the instance data structures. The method also includes training, until convergence, a ranking model on the training dataset using a pairwise ranking loss function that modifies a sequence of layers of the ranking model to maximize a score output by the ranking model. The score represents a probability that a combination of an instance data structure and a corresponding natural language query, when inserted into a conversion prompt of a conversion model, increases a performance of the conversion model when converting a new natural language query into a new instance data structure. After convergence, the ranking model is returned as a trained ranking model.

20 Claims, 7 Drawing Sheets

(51) Int. Cl.
*G06F 16/383* (2019.01)
*G06F 17/20* (2006.01)

(56) References Cited

U.S. PATENT DOCUMENTS

2024/0330742 A1* 10/2024 Hunn ..................... G06N 20/00
2024/0378198 A1* 11/2024 Latendresse ........ G06F 16/2425
2025/0131320 A1* 4/2025 Chandra ................ G06N 3/084
2025/0265257 A1* 8/2025 Shamir ............. G06F 16/24578

* cited by examiner

TRAINING OF IMPROVED MACHINE LEARNING MODEL FOR CONVERTING QUERIES TO A PROGRAMMING LANGUAGE

CROSS-REFERENCE TO RELATED APPLICATIONS

This application claims priority to Indian provisional patent application number 202541040075, filed Apr. 25, 2025, the entirety of which is hereby incorporated by reference. Additionally, this application is related to U.S. application Ser. No. 19/195,570, filed on the same date as this patent application.

BACKGROUND

Language models are a type of deep learning machine learning model that may be used to perform natural language tasks. For example, language models can summarize large amounts of text, generate new text describing a subject of interest, etc. Language models also can be used to answer queries.

However, language models suffer from a significant number of limitations. One of the limitations is that language models are often inaccurate or return wrong information when an open-ended query is submitted to the language model regarding information in a database. When a language model returns wrong or nonsensical answers, the language model may be said to "hallucinate," though language models do not hallucinate as a human might hallucinate.

For example, assume that a language model has access to a database storing financial information used by an application-specific financial management application. The language model supports the application-specific financial management application and may answer various questions for the user. The user submits the following query to the language model: "How is my business doing?" The language model accesses the database, but is unable to interpret what the user intends because the question is too general. As a result, the language model either returns an output indicating that the language model is unable to process the query, or the language model hallucinates, such as to return the output: "Fine, how are you?" The user becomes frustrated, particularly if the user is not trained to generate structured queries that would return the information sought from the database.

Thus, a technical problem is presented. The technical problem is solving the above-mentioned language model difficulties, and in particular the technical problem is improving a computer in a manner that permits a language model to return an appropriate output (as opposed to an incorrect or detrimental hallucination) in response to general or ambiguous questions pertaining to information in a database.

SUMMARY

One or more embodiments provide for a method. The method includes receiving a training dataset. The training data set includes a number of predetermined natural language queries including a domain. The training data set also includes a number of predetermined instance data structures storing the number of predetermined natural language queries in a domain-specific language corresponding to the domain. The domain-specific language includes a number of predefined terms representable in a predefined data structure. Each of the number of predetermined instance data structures represents a corresponding instance of the predefined data structure. Each of the number of predetermined natural language queries corresponds to one of the number of predetermined instance data structures. The method also includes training, until convergence, a ranking model on the training dataset using a pairwise ranking loss function that modifies a sequence of layers of the ranking model to maximize a score output by the ranking model. The score represents a probability that a combination of a given instance data structure in the number of predetermined instance data structures and a corresponding natural language query in the number of predetermined natural language queries, when inserted into a conversion prompt of a conversion model, increases a performance of the conversion model when converting a new natural language query into a new instance data structure. The method also includes returning, after convergence, the ranking model as a trained ranking model.

One or more embodiments also provide for a system. The system includes a computer processor and a data repository in communication with the computer processor. The data repository stores a training dataset. The training dataset includes a number of predetermined natural language queries including a domain. The training dataset also includes a number of predetermined instance data structures storing the number of predetermined natural language queries in a domain-specific language corresponding to the domain. The domain-specific-language includes a number of predefined terms representable in a predefined data structure. Each of the number of predetermined instance data structures represents a corresponding instance of the predefined data structure. Each of the number of predetermined natural language queries corresponds to one of the number of predetermined instance data structures. The data repository also stores a score representing a probability that a combination of a given instance data structure in the number of predetermined instance data structures and a corresponding natural language query in the number of predetermined natural language queries, when inserted into a first prompt of a conversion model, increases a performance of the conversion model when converting a new natural language query into a new instance data structure. The system also includes a ranking model including a sequence of layers. The ranking model is executable by the computer processor. The system also includes a training controller including a pairwise ranking loss function that modifies a sequence of layers of the ranking model to maximize a score output by the ranking model. The training controller is executable by the computer processor to train, until convergence, the ranking model on the training dataset using the pairwise ranking loss function to modify the sequence of layers of the ranking model to maximize the score output by the ranking model. The training controller is also executable by the computer processor to return, after convergence, the ranking model as a trained ranking model.

One or more embodiments provide for another method. The method includes receiving a training dataset. The training dataset includes a number of predetermined natural language queries including a domain. The training dataset also includes a number of predetermined instance data structures storing the number of predetermined natural language queries in a domain-specific language corresponding to the domain. The domain-specific language includes a number of predefined terms representable in a predefined data structure. Each of the number of predetermined instance data structures represents a corresponding instance of the predefined data structure. Each of the number of predetermined natural language queries corresponds to one of the number of predetermined instance data structures. The method also includes training, until convergence, a ranking model on the training dataset using a pairwise ranking loss function that modifies a sequence of layers of the ranking model to maximize a score output by the ranking model. The score represents a probability that a combination of a given instance data structure in the number of predetermined instance data structures and a corresponding natural language query in the number of predetermined natural language queries, when inserted into a first prompt of a conversion model, increases a performance of the conversion model when converting a new natural language query into a new instance data structure. Training further includes generating the first prompt that instructs the conversion model to convert a test natural language query into a test instance data structure. The first prompt further includes a randomly selected subset of the training data including a subset of the number of predetermined natural language queries and a corresponding subset of the number of predetermined instance data structures. The test natural language query has a corresponding expected instance data structure. Training further includes executing the conversion model on the first prompt to generate the test instance data structure. Training further includes comparing the test instance data structure to the corresponding expected instance data structure to generate a performance metric of the conversion model. Training further includes updating the pairwise ranking loss function of the ranking model based on the performance metric of the conversion model. The method also includes returning, after convergence, the ranking model as a trained ranking model.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

Figure 1A:
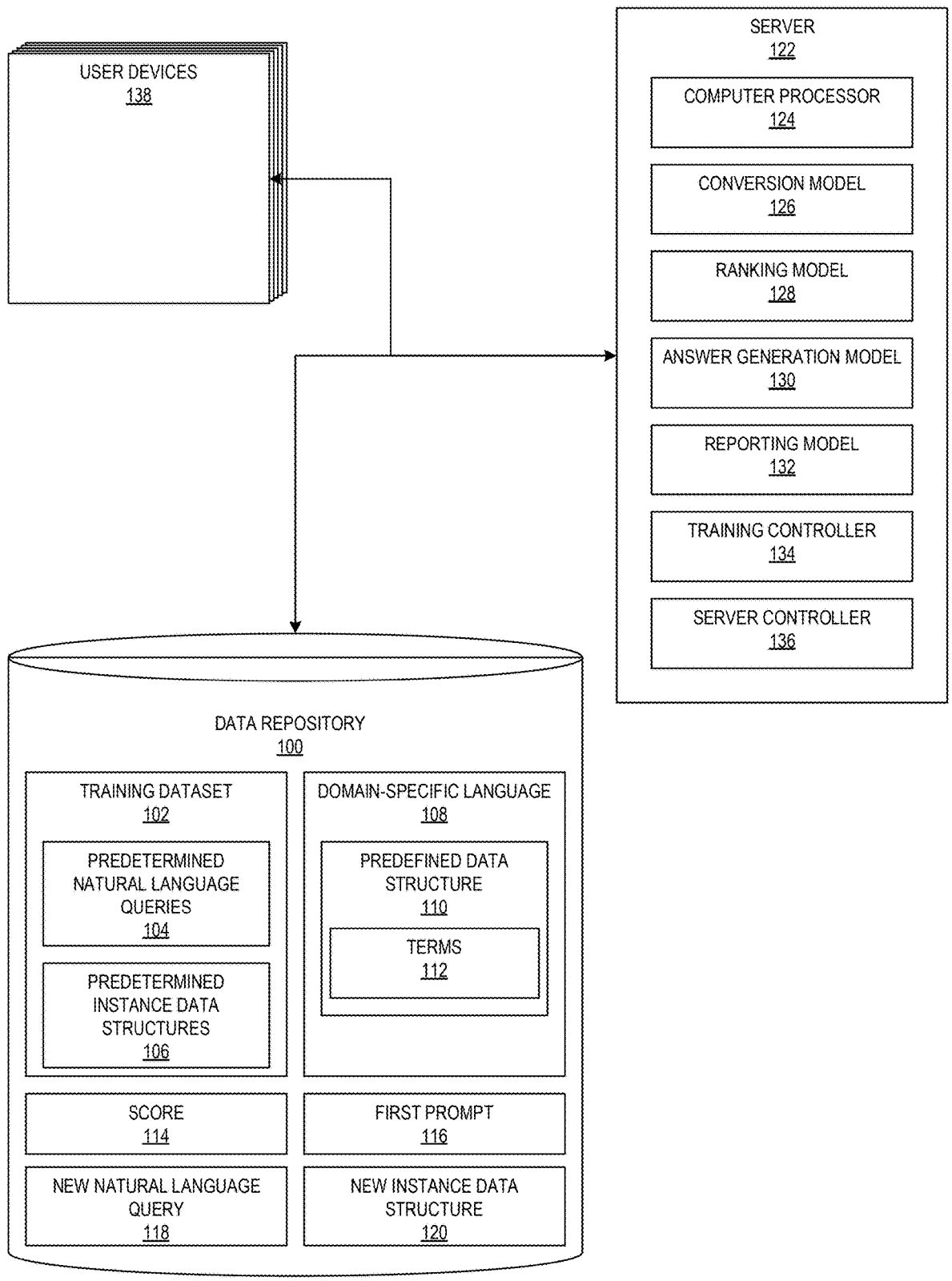
FIG. 1A and FIG. 1B show a computing system, in accordance with one or more embodiments.

One or more embodiments are directed to a technical solution to the above-identified technical problem. In brief, the technical solution involves training a ranking model (detailed below) to select a subset of examples, from a much larger set of examples, that are pertinent to a currently submitted natural language query. Each example is a predetermined natural language query and a corresponding instance data structure. The instance data structure is a conversion of the natural language query into a domain-specific language for that predetermined natural language query. Once selected, the subset of examples are inserted into a conversion prompt that is used to instruct a conversion model to convert the current natural language query into a current instance data structure in the domain-specific language. The subset of examples help provide context upon which the conversion model can draw when converting the current natural language query into the current instance data structure.

However, training the ranking model is a non-trivial problem. First, given the vast number of variations in new natural language queries that users may submit, a large number of predetermined natural language queries and their corresponding predetermined instance data structures are preferably available. In most cases, generating that available example dataset is beyond the available resources of technical specialists. Thus, a synthetic dataset that contains predetermined natural language queries and their corresponding predetermined instance data structures should be generated automatically. The task is difficult, because in the ordinary course of converting natural language queries to instance data structures, the subset of examples are used to permit the conversion model to perform an accurate conversion. In other words, generating the synthetic dataset may be analogized to the classic conundrum of the question, 'which came first, the chicken or the egg.'

Second, training the ranking model to select the subset of examples that would be most pertinent to a current natural language query is also a non-trivial problem. If ten thousand examples are available (each example being a predetermined natural language query and a corresponding predetermined instance data structure), and only one to fifteen examples are desirable for use by the conversion model that converts a current natural language query to a current instance data structure, then the technical problem becomes how to train the ranking model to select the most appropriate examples from the overall set of examples.

The technical solution to training the ranking model involves training a ranking model to select a subset of examples from among a pool of examples. Each example is a predetermined natural language query and a corresponding predetermined instance data structure in a domain-specific language. The examples are inserted into a conversion prompt that serve (in part) as input to a conversion model. The conversion model uses the examples as a guide when converting a new natural language query to a new instance data structure.

Figure 1B:
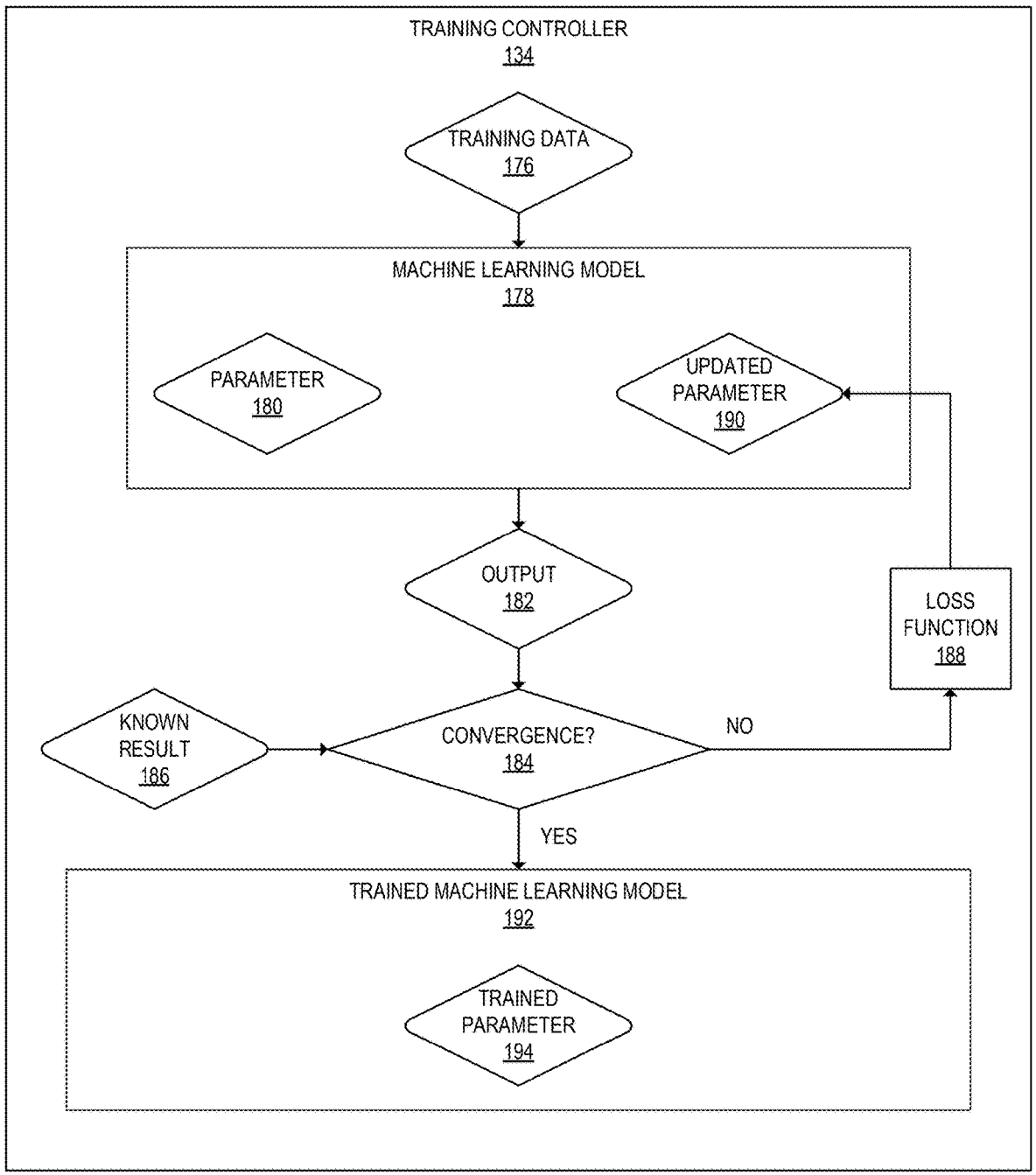
Figure 2:
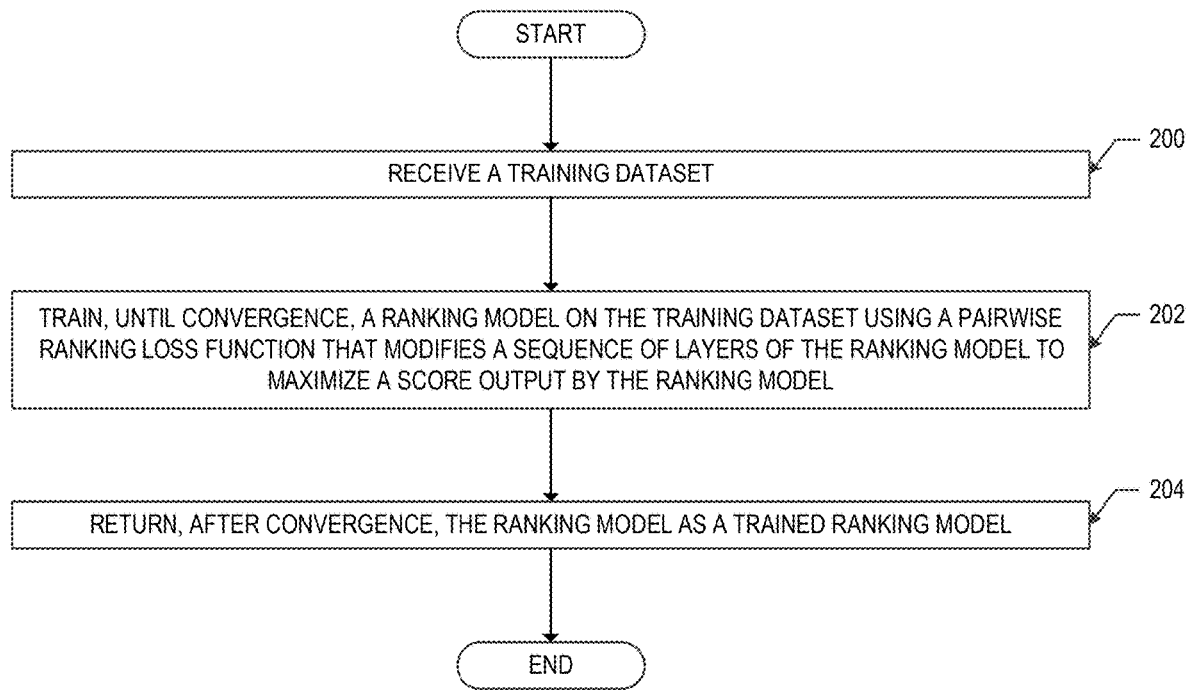
FIG. 2 shows a flowchart of a method for training a language model to convert queries to an improved programming language, in accordance with one or more embodiments.

The details of training the ranking model are described in FIG. 1B and in FIG. 2. However, briefly, a pairwise ranking loss function may be used during an iterative training process of the ranking model. More particularly, the ranking model generates the examples, which are then executed by the conversion model to convert a test natural language query to a test instance data structure. The test natural language query and instance data structure are then measured for accuracy. The accuracy is then used in the pairwise ranking loss function to modify a number of parameters, particularly a margin hyperparameter of the ranking model, to improve the performance of the ranking model in selecting examples that are more likely to aid the conversion model in converting predetermined natural language queries into instance data structures. Training continues until convergence (e.g., until the performance of the conversion model and the ranking model do not further improve significantly, after a predefined number of training iterations, etc.)

Additional details regarding one or more embodiments are presented below. Additionally, one or more embodiments may include additional steps that further enhance the answer. Thus, attention is now turned to the figures.

FIG. 1A shows a computing system, in accordance with one or more embodiments. The system shown in FIG. 1A includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The new natural language query (118) includes a number of predetermined natural language queries (104). The predetermined natural language queries (104) are either synthetic natural language queries that are generated as part of a synthetic dataset (described below) or are past natural language queries that were successfully converted into instance data structures. In either case, the predetermined natural language queries (104) have known corresponding predetermined instance data structures (106), defined below.

Each of the predetermined natural language queries are associated with a domain. A domain is an area of knowledge or a subject of the new natural language query (118). For example, if the domain pertains to financial management questions, then the domain may be financial management. In another example, if the domain pertains to documents having the portable document file (PDF) file extension, then the domain may be PDFs.

The domain may be useful in one or more embodiments, as the domain may indicate that certain commands or structures be potentially available in the domain-specific language (108) (defined below) should be made available for selection in the predefined data structure (110) when the new instance data structure (120) (defined below) is generated from the predefined data structure (110). Stated differently, different domains may indicate the desirability of different commands or data structures being made available in the predefined data structure (110) for when the new instance data structure (120) is generated as described with respect to FIG. 2. The domain-specific language (108) also may be referred to as an intermediate representation of a new natural language query (118), as the domain-specific language (108) allows the new natural language query (118) to be translated into the new instance data structure (120) which is better suited for processing by the answer generation model (126) (defined below).

As indicated above, each of the predetermined natural language queries (104) are associated with a corresponding one of a number of predetermined instance data structures (106). The predetermined instance data structures (106) are data structures in a domain-specific language described below. The domain-specific language is expressed in a structured language data structure, which is one of the predetermined instance data structures (106).

The predetermined instance data structures (106) are expressed in a domain-specific language corresponding to the domain defined above. The domain-specific language is a number of predefined terms (described below) represented in a predefined data structure (e.g., the predetermined instance data structures (106) or the new instance data structure (120)). Thus, each of the predetermined natural language queries (104) represents a corresponding instance of the predefined data structure (110). Additionally, each of the predetermined natural language queries corresponds to one of the predetermined instance data structures.

The data repository (100) also stores a domain-specific language (108). The domain-specific language (108) is, as indicated above, a number of predefined terms (112) representable in a predefined data structure (110). The language may be expansive and contain many possible terms (112) that may be combined into a new instance data structure (120), just as natural language may be expansive and contain many possible words that may be combined into phrases, sentences, paragraphs, etc.

The predefined data structure (110) has a defined structure that may be expressed in a structured language format. Thus, for example, the predefined data structure (110) defines a symbology (defined below) that indicates the type of the terms (112) expressed in the predefined data structure (110), an order of execution of instruction terms, instructions for beginning and ending a new instance data structure (120), etc.

The predefined data structure (110) also includes a number of terms (112), as indicated above. The terms (112) include at least two types of terms, entity terms and instruction terms. An entity term defines an entity (e.g., a name, data to be stored in the predetermined instance data structures (106) or the new instance data structure (120), etc.). An instruction term is a command.

The domain-specific language (108) also includes a type of the terms (112) that is not found in other structure languages (e.g., structure query language (SQL), python, etc.). In particular, the terms (112) include a type of term referred to as an insight term. An insight term is a single instruction term that requires multiple operations (i.e., second order of operations) in order to return an output, or otherwise orders an operation not available in available structured languages.

The data repository (100) also stores a score (114). The score (114) is an output of the answer generation model (130). The score (114) represents a probability, assigned to an example in a number of examples, that the example is relevant to the new natural language query (118) (defined below). An example is a combination of one of the predetermined natural language queries (104) and the corresponding one of the predetermined instance data structures (106) that is known to correctly convert that one of the predetermined natural language queries (104) into the domain-specific language. Thus, the training dataset (102) includes many examples, one example for each pair of the predetermined natural language queries (104) and the predetermined instance data structures (106).

The data repository (100) also stores a first prompt (116). The first prompt (116) is a prompt to be submitted to the conversion model (126) (defined below). A prompt, generally, is natural language instructions to a language model that describe the task the language model is to perform, constraints on the language model when performing the task, and possibly other instructions or data (such as the examples selected by the ranking model (128) (defined below), as described with respect to FIG. 2). The first prompt (116), in particular, is instructions to the conversion model (126).

More specifically, the first prompt (116) instructs the conversion model (126) to convert the new natural language query (118) into a domain-specific language (108) (defined below) corresponding to the domain of the new natural language query (118). The domain-specific language (108), as defined more fully below, includes a number of predefined terms (112) representable in a predefined data structure (110) (all defined below). The instructions and use of the prompt are described with respect to Step 202 of FIG. 2.

The data repository (100) also stores a new instance data structure (120). The new instance data structure (120) is a specific instance of the predefined data structure (110). The new instance data structure (120), in particular, may contain less than all (i.e., a subset) of the available commands, definitions, and other aspects of the domain-specific language.

Thus, the new instance data structure (120) includes a subset of terms (112). The subset of terms (112) is a subset of the terms (112) available in the predefined data structure (110). The subset of terms (112) are also associated with specific information related to the new natural language query (118) or the domain which applies to the new natural language query (118). Examples of such information may include, for example, commands that are selected to implement the command specified or inferred from the new natural language query (118), entity terms specified or inferred from the new natural language query (118), a domain designation, etc.

Examples and details of the domain-specific language (108), the predefined data structure (110), the terms (112), the new instance data structure (120), and the subset of terms are now provided. Most generally, the domain-specific language (108) may be defined according to a predetermined template, which is the predefined data structure (110). The predefined data structure (110) may be expressed, in one example, as follows:

{"function_name": "<dataset_name>", "attributes": {
  "Transaction_date": {"macroName": <macro Value>},
  <create_dervied_column>,
  <Filter_string_column>,
  <Filter_date_column>,
  <Filter_numerical_column>,
  "Groupby": [<column_1>, . . . , <column_n>],
  "Aggregation": {<agg_column>: <agg_function>},
  "Sortby": {<column>: <asc/desc>},
  "Limit": <n>,
  "Insight": {<type>,<kpi>,<granularity>, . . . }
}}

Each statement (a word or a group of words connected by an underscore, "_") is an example of one of the terms (112). The above example of the predefined data structure (110) may contain additional terms (112). However, the data repository (100) may include fewer terms or modified terms (112). In an embodiment, the term "<dataset_name>" may be used during the conversion of each received new natural language query (118). Other examples of the terms (112) and various attributes expressed in the example predefined data structure (110) above may be optional and may be added when useful for answering a specific new natural language query (118).

The following table shows example definitions of the terms (112) presented in the above example of the predefined data structure (110), along with an example:

| | |
|---|---|
| Dataset_name | Sales / bills / invoice / expenses / profit_loss etc |
| Filter_transaction_date | "transaction_date": { "macroName": "THIS_YEAR"} "transaction_date" : {"macroName": "CUSTOM", "startDate": "2024-01-01", "endDate": "2024-01-15"} Note: transaction_date is a special date column which is common across all datasets and supports filtering via macros |
| Filter_string_column | "vendor" : ["Business Name", "Business Alias"] "account" : ["Utilities"] |
| Filter_date_column | "due_date" : {"less_than": "2024-02-01" , "greater_than": "2024-01-15"} |
| Filter_numerical_column | "open_balance" : {"greater_than": 0} "amount" : {"less than": 500}, |
| create_derived_column | <new_column_name>: {<udf>: [<column_1>, . . . ,<column_n>] } Note: udf is a custom python function defined in the data QnA. |
| Groupby + Aggregation | "groupby" : ["account"], "aggregation" : {"open_balance": "sum" } Note: Aggregated column name would be "<agg_function>_< agg_column>" |
| Sort + Limit | "sortby": {"sum_open_balance": "desc"}, "limit": 5 |
| Insight | "Insight": { "type":"trend", "kpi":"sales", "granularity":["month","quarter"] } |

The new natural language query (118) may include first order fact questions. First order fact questions may be answered by making a single call to a reporting application programming interface (API) of a database or to an application.

An example of a new instance data structure (120) of a first order fact question is provided below. The new natural language query (118) is, "What are the top 5 accounts with unpaid bills for 'Business Name' shown this quarter?"

{"function_name": "bills", "attributes": {
  "transaction_date": {"macroName": "this_quarter"},
  "vendor": ["Business Name"],
  "open_balance": {"greater_than": 0},
  "groupby": ["account"],
  "aggregation": {"open_balance": "sum"},
  "sortby": {"sum_open_balance": "desc"},
  "limit": 5
}}

In the above example, the subset of terms (112) include entity terms such as "function_name," "transaction_date," "vendor," and "open_balance." The subset of terms (112) also include command terms, such as "groupby," "aggregation," "sortby," and "limit."

The data repository also may store other prompts. The other prompts are a prompt for a language model, as is the first prompt (116). However, the other prompts instructs the other language models described herein. For example, an answer generation prompt (a second prompt) may be used as input to the answer generation model (130) (defined below) to generate a response to the new natural language query (118). The prompt to the answer generation model (130) includes the new instance data structure (120) generated for the new natural language query (118). The prompt also may include other instructions to the answer generation model (130) with respect to generating an answer to the new natural language query (118).

The answer is the output of the answer generation model (130). The answer, specifically, is the answer to the new natural language query (118) that is reported (i.e., returned to one of the user devices (138), stored, transmitted to another process, etc.)

The system shown in FIG. 1A may include other components. For example, the system shown in FIG. 1A also may include a server (122). The server (122) is one or more computer processors, data repositories, communication devices, and supporting hardware and software. The server (122) may be in a distributed computing environment. The server (122) is configured to execute one or more applications, such as the conversion model (126), the ranking model (128), the answer generation model (130), the reporting model (132), the training controller (134), and the server controller (136). An example of a computer system and network that may form the server (122) is described with respect to FIG. 4A and FIG. 4B.

The server (122) includes a computer processor (124). The computer processor (124) is one or more hardware or virtual processors which may execute computer readable program code that defines one or more applications, such as the conversion model (126), the ranking model (128), the answer generation model (130), the reporting model (132), the training controller (134), and the server controller (136). An example of the computer processor (124) is described with respect to the computer processor(s) (402) of FIG. 4A.

The server (122) also includes a variety of language models, including the conversion model (126), the ranking model (128), the answer generation model (130), and the reporting model (132). Because each of the models may be a language model, each of the models share some common characteristics.

For example, a language model is a natural language processing machine learning model. An example of the language model may be a large language model, such as CHATGPT® by OpenAI. However, different language models may be used for the conversion model (126), the ranking model (128), the answer generation model (130), the reporting model (132), or the server controller (136).

In addition, some or all of the conversion model (126), the ranking model (128), the answer generation model (130), and the reporting model (132) may be the same or different language models. For example, the same language model could perform each of the functions of the conversion model (126), the ranking model (128), the answer generation model (130), and the reporting model (132). Conversely, each of the models may be different language models, possibly different types of language models. Some of the models may be the same model, and other different models. The primary distinguishing facet of each of the conversion model (126), the ranking model (128), the answer generation model (130), and the reporting model (132) is the function that each model performs in one or more embodiments, such as in the method of FIG. 2.

The conversion model (126) is a language model that converts the new natural language query (118) into the new instance data structure (120) according to the instructions of the first prompt (116). Thus, the input to the conversion model (126) is the new natural language query (118) and the first prompt (116), and the output of the conversion model (126) is the new instance data structure (120).

The ranking model (128) is a language model that selects, from among a set of examples, a subset of examples for inclusion in the first prompt (116) for the conversion model (126). The ranking model (128) (also referred to as a third model herein) may be a bidirectional encoder representations from transformers (BERT) language model, but also may be some other type of language model.

The input to the ranking model (128) is the new natural language query (118), and the output of the ranking model (128) is one or more examples taken from the set of examples that are available. Each example is a sample question and a sample instance data structure (114) that represents the question in the domain-specific language. Thus, each example is a pair including one of the predetermined natural language queries (104) and a corresponding one of the predetermined instance data structures (106). The input to the ranking model (128) also may include an additional prompt (a "ranking prompt") that contains other instructions and constraints on how to select the subset of examples from the set of examples.

For example, twenty examples taken from the example set may be inserted into the first prompt (116) on which the conversion model (126) is executed. The subset of examples may be the top "N" number of examples, as ranked by the ranking model (128).

One or more embodiments also provide for training the ranking model (128). Training of the ranking model (128) is described with respect to FIG. 1B.

The answer generation model (130) is a language model that generates the answer. The input to the answer generation model (130) is the answer prompt, which includes the new instance data structure (120) output by the conversion model (126). The output of the answer generation model (130), as indicated above, is the answer.

The reporting model (132) may be present in some embodiments. The reporting model (132) is a language model that converts the answer into a narrative format that may be easier for some users to interpret. For example, the input to the reporting model (132) may be the answer, and the output of the reporting model (132) may be a narrative summary or narrative restatement of the answer. The input to the reporting model (132) also may include an additional prompt (a "reporting prompt") that contains other instructions and constraints on how to format the answer. The output of the reporting model (132) is a reformatted answer or modified answer. The reformatted or modified answer may be returned to a user device, stored, transmitted to a different computer process, etc.

The server (122) also includes a training controller (134). The training controller (134) is software or application-specific hardware programmed to train one or more of the models, such as the conversion model (126), the ranking model (128), the answer generation model (130), and the reporting model (132). Details of training the ranking model (128), in particular, are provided in FIG. 1B.

The server (122) also may include a server controller (136). The server controller (136) is software or application-specific hardware which, when executed by the computer processor (124), controls and coordinates operation of the software or application-specific hardware described herein. Thus, the server controller (136) may control and coordinate execution of the conversion model (126), the ranking model (128), the answer generation model (130), and the reporting model (132). The server controller (136) also may control interaction with other components of the system of FIG. 1 with the server controller (136). Thus, the server controller (136) also may execute the method of FIG. 2 and the variations thereof.

The system shown in FIG. 1A also may include one or more user devices (138). The user devices (138) are computing systems (e.g., the computing system (400) shown in FIG. 4A) that communicate with the server (122).

The user devices (138) may be considered remote or local. A remote user device is a device operated by a third-party (e.g., an end user of a chatbot) that does not control or operate the system of FIG. 1A. Similarly, the organization that controls the other elements of the system of FIG. 1A may not control or operate the remote user device. Thus, a remote user device may not be considered part of the system of FIG. 1A. In contrast, a local user device is a device operated under the control of the organization that controls the other components of the system of FIG. 1A. Thus, a local user device may be considered part of the system of FIG. 1A.

Attention is turned to FIG. 1B, which shows the details of the training controller (134). The training controller (134) is a training algorithm, implemented as software or application-specific hardware, that may be used to train one or more of the machine learning models described with respect to the computing system of FIG. 1A.

In general, machine learning models are trained prior to being deployed. The process of training a model, briefly, involves iteratively testing a model against test data for which the final result is known, comparing the test results against the known result, and using the comparison to adjust the model. The process is repeated until the results do not improve more than some predetermined amount, or until some other termination condition occurs. After training, the final adjusted model is applied to unknown data (i.e., data for which the actual result is not known) in order to make predictions.

Some machine learning models may be applied to vector data structures. A vector is a computer readable data structure. A vector may take the form of a matrix, an array, a graph, or some other data structure. However, a frequently used vector form is a one by N matrix, where each cell of the matrix represents the value for one feature. As described above, a feature is a topic of data (e.g., a color of an object, the presence of a word or alphanumeric text, a physical measurement type, etc.). A value is a numerical or other recorded specification of the feature. For example, if the feature is the word "cat," and the word "cat" is present in a corpus of text, then the value of the feature may be "1" (to indicate a presence of the feature in the corpus of text).

In one or more embodiments, some of the data in the data repository (100) of FIG. 1A may be stored in the form of one or more vectors. For example, the training dataset (102) may be expressed as one or more vectors. Similarly, the predetermined natural language queries (104), the predetermined instance data structures (106), the domain-specific language (108), the predefined data structure (110), and the terms (112) may be converted from natural language into vectors as part of training the language model (126).

Returning to the operation of the training controller (134), training starts with training data (176), which may be expressed in vector form. The training data (176) may be the training dataset (102) from FIG. 1A, expressed in vector form, or may be natural language in some cases.

More generally, the training data (176) is provided as input to the machine learning model (178), which may be the conversion model (126), the ranking model (128), the answer generation model (130), or the reporting model (132) of FIG. 1A. The machine learning model (178) may be characterized as a program that has adjustable parameters. The program is capable of learning and recognizing patterns to make predictions. The output of the machine learning model (178) may be changed by changing one or more parameters of the algorithm, such as the parameter (180) of the machine learning model (178). The parameter (180) may be one or more weights, the application of a sigmoid function, a hyperparameter, or possibly many different variations that may be used to adjust the output of the function of the machine learning model (178).

One or more initial values are set for the parameter (180). The machine learning model (178) is then executed on the training data (176). The result is an output (182), which is a prediction, a classification, a value, or some other output which the machine learning model (178) has been programmed to output.

The output (182) is provided to a convergence process (184). The convergence process (184) is programmed to achieve convergence during the training process. Convergence is a state of the training process, described below, in which a predetermined end condition of training has been reached.

In the case of unsupervised machine learning (e.g., in a BERT model, such as may be used for the ranking model (128)), the convergence process (184) may be compared to the output (182), or to a prior output in order to determine a degree to which the current output changed relative to the immediately prior output, or to the original output. Once the degree of change fails to satisfy the threshold degree of change, then the machine learning model may be considered to have achieved convergence. Alternatively, an unsupervised model may determine pseudo labels to be applied to the training data and then achieve convergence as described above for a supervised machine learning model. Other machine learning training processes exist, but the result of the training process may be convergence.

If convergence has not occurred (a "no" at the convergence process (184)), then a loss function (188) is generated. The loss function (188) is a program which adjusts the parameter (180) (one or more weights, settings, etc.) in order to generate an updated parameter (190). The basis for performing the adjustment is defined by the program that makes up the loss function (188). The program may be an algorithm which attempts to guess how the parameter (180) may be changed so that the next execution of the machine learning model (178), using the training data (176) with the updated parameter (190), has an output (182) that is more likely to result in convergence. In this manner, the next execution of the machine learning model (178) is more likely to match the known result (186) (supervised learning), or which is more likely to result in an output (182) that more closely approximates the prior output (one unsupervised learning technique), or which otherwise is more likely to result in convergence.

In any case, the loss function (188) is used to specify the updated parameter (190). The details of the loss function are provided below.

As indicated, the machine learning model (178) is executed again on the training data (176), this time with the updated parameter (190). The process of execution of the machine learning model (178), execution of the convergence process (184), and the execution of the loss function (188) continues to iterate until convergence.

Upon convergence (a "yes" result at the convergence process (184)), the machine learning model (178) is deemed to be a trained machine learning model (192). The trained machine learning model (192) has a final parameter, represented by the trained parameter (194). Again, the trained parameter (194) shown in FIG. 1B may be multiple parameters, weights, settings, etc.

During deployment, the trained machine learning model (192) with the trained parameter (194) is executed again, but this time on unknown data (e.g., the new natural language query (118)) for which the final result (e.g., the new instance data structure (120) in the case of the conversion model (126) or one or more examples in the case of the ranking model (128)) is not known. The output of the trained machine learning model (192) is then treated as a prediction of the information of interest relative to the unknown data.

Additional details regarding the training of the ranking model (128) are now provided. Again, the function of the ranking model (128) is to take, as input, the new instance data structure (120) and to generate, as output, a set of examples from the training dataset (102) (i.e., pairs of the predetermined natural language queries (104) and the predetermined instance data structures (106)).

Specifically, the ranking model (128) is trained to select the best "k" examples from the training corpus for a given question. At inference time, for a given question Q, model M is used to dynamically select the k examples from the training corpus and these examples are added as few-shot examples in the prompt to the answer generation model (130). Pairwise ranking loss functions may be used to train the model M, whose details are provided below:

Given a training corpus (i.e., the training dataset (102)):

$$T=\{E_1, \ldots, E_n\} \text{ where } E_i=(Q_i, Y_i). \quad (1)$$

Where Q is the input Question and Y is the expected output (the intermediate representation, or one of the predetermined instance data structures (106)).

For a given question Q, a random subset of examples may be taken from T and used to create a few-shot prompt $P_{Q,Z}$ for input to the answer generation model (130) where $Z \subset T$, $|Z| \leq k$. Note that Z could also be a null set.

In this case, the pairwise ranking loss may be defined as:

$$\text{Loss} = \Sigma_{P_{QZ}} \Sigma_{E_i, E_j \in T \setminus Z} \max(0, m - (perf_{LLM}(P_{Q,Z}, E_i) - perf_{LLM}(P_{Q,Z}, E_j)))(\text{score}_M(P_{Q,Z}, E_i) - \text{score}_M(P_{Q,Z}, E_j))) \quad (2)$$

In equation (2), the following definitions apply.
"m" is the margin and is a hyperparameter.

$$perf_{LLM}(P_{Q,Z}, E_i) = perf(LLM(P_{Q,Z}, E_i), Y)$$

One or more embodiments measure the performance of the ranking model (128) after adding example $E_i$ to the prompt $P_{Q,K}$. Output performance may be measured in terms of the accuracy, quality, and other performance metrics of the ranking model (128).

Y is the expected output for question Q.

The term "$\text{score}_M(P_{Q,Z}, E_i)$" is the score assigned by the ranking model M to example $E_i$ given prompt $P_{Q,Z}$.

Training model M with the above pairwise loss function makes the ranking model (128) learn to assign higher scores to examples which are more likely to increase the performance of the answer generation model (130) when added in the prompt for the answer generation model (130), for a given question new instance data structure (120).

A cross-encoder may be used to implement model M. The cross-encoder uses a sequence of embedding layer, dense layers, and a sigmoid layer to compute the score.

While FIG. 1A and FIG. 1B shows a configuration of components, other configurations may be used without departing from the scope of one or more embodiments. For example, various components may be combined to create a single component. As another example, the functionality performed by a single component may be performed by two or more components.

FIG. 2 shows a flowchart of a method for training a language model to convert queries to an improved programming language, in accordance with one or more embodiments. The method of FIG. 2 may be implemented using the system of FIG. 1A and FIG. 1B, and one or more of the steps may be performed on or received at one or more computer processors.

Step 200 includes receiving a training dataset. The training dataset may be received using a number of different techniques. For example, the training dataset may be received by retrieving or receiving the training dataset from a data repository, whether from a local computer or a remote computer. However, the training dataset also may be generated automatically by generating a synthetic training dataset. A method for generating the synthetic training dataset is presented below at the end of the description for the method of FIG. 2.

As indicated above with respect to FIG. 1, the training dataset includes a number of predetermined natural language queries including a domain. The training dataset also includes a number of predetermined instance data structures storing the number of predetermined natural language queries in a domain-specific language corresponding to the domain. The domain-specific language includes a number of predefined terms representable in a predefined data structure. Each of the number of predetermined instance data structures represents a corresponding instance of the predefined data structure. Each of the number of predetermined natural language queries corresponds to one of the number of predetermined instance data structures;

Step 202 includes training, until convergence, a ranking model on the training dataset using a pairwise ranking loss function that modifies a sequence of layers of the ranking model to maximize a score output by the ranking model. Training at Step 202 may proceed as described with respect to FIG. 1B. In the case that the ranking model is a BERT model, the training may be an unsupervised training technique, as described with respect to FIG. 1B. The process of using the pairwise ranking loss function to maximize a score output by the ranking model is also described with respect to FIG. 1B.

As indicated with respect to FIG. 1A, the score represents a probability that a combination of a given instance data structure in the number of predetermined instance data structures and a corresponding natural language query in the number of predetermined natural language queries, when inserted into a first prompt of a conversion model, increases a performance of the conversion model when converting a new natural language query into a new instance data structure.

Training at Step 202 may also be performed as follows. First, a second prompt is generated. The second prompt instructs the conversion model to convert a test natural language query into a test instance data structure. The second prompt further includes a training subset of the training dataset. The training subset includes a subset of the number of predetermined natural language queries and a corresponding subset of the number of predetermined instance data structures. The test natural language query has a corresponding expected instance data structure.

Next, the conversion model is executed on the second prompt to generate the test instance data structure. Then, the test instance data structure is compared to the corresponding expected instance data structure to generate a performance metric of the conversion model. The pairwise ranking loss function of the ranking model is updated based on the performance metric of the conversion model (see, e.g., the description of the pairwise loss function in FIG. 1B). The pairwise ranking loss function may be further based on a combination of the performance metric and a margin hyperparameter of the ranking model.

In an embodiment, the test natural language query and corresponding test instance data structure include an example. In this case, the pairwise ranking loss function is further based on a combination of the performance metric, a margin hyperparameter, and the score assigned by the ranking model to the example. The margin hyperparameter includes a setting that controls a distance between different possible predictions of the ranking model.

In general, a margin hyperparameter in a language model refers to a setting that controls the gap, or distance, between different possible predictions the model makes. Thus, the margin hyperparameter influences how confident the model needs to be in its output before making a decision. The margin hyperparameter may be used to balance between accuracy and generalization, where a larger margin might lead to more conservative predictions, and better generalization, but potentially lower accuracy on the training dataset.

Step 204 includes returning, after convergence, the ranking model as a trained ranking model. The ranking model may be returned by making the ranking model available to a server. For example, the ranking model may be instantiated on an enterprise system executed by the server, the ranking model may be called by the server, the ranking model may be stored and executed locally, or may be made available according to another arrangement.

The method of FIG. 2 may be varied. For example, the trained ranking model may be further trained to output, as a number of examples, a subset of the number of predetermined instance data structures and a corresponding subset of the number of predetermined natural language queries having corresponding scores above a threshold score. The corresponding scores are instances of the score.

In another variation, the trained ranking model may be further trained to output a maximum number of the number of examples. Thus, the number of examples that are to be inserted into the second prompt (for the answer generation model) may be kept within a predetermined number of possible examples.

The method of FIG. 2 also may include use of the trained ranking model. Thus, the method of FIG. 2 also may include receiving a new natural language query. The first prompt is then generated. The first prompt instructs the conversion model to convert the new natural language query into a new instance data structure in the domain-specific language.

A second prompt is then generated. The second prompt instructs the ranking model to select, from among the number of predetermined instance data structures and the number of predetermined natural language queries, at least one example including at least one of the number of predetermined instance data structures and a corresponding at least one of the number of predetermined natural language queries.

The ranking model is then executed on the second prompt to output the at least one example. The at least one example is inserted in the second prompt to generate a few-shot prompt. The conversion model is executed on the few-shot prompt to generate the new instance data structure. The new instance data structure is returned (e.g., stored, displayed to a user, transmitted to another computing process such as the answer generation model, etc.).

Continuing the example, the method also may include generating an answer prompt that instructs an answer generation model to generate an answer to the new natural language query. The answer prompt further includes the new instance data structure. The answer generation model may be executed on the answer prompt to generate an answer. The answer may be returned to a user device.

Still other variations of the method of FIG. 2 are possible. For example, the method also may include disambiguating, prior to generating the answer prompt, the new instance data structure. Disambiguation may be performed using a fuzzy matching algorithm to disambiguate terms in the new instance data structure (120) that could have multiple definitions.

In this case, the method also may include executing, prior to returning the answer, a reporting model on the answer to generate a natural language answer. The reporting model takes, as input, the output of the answer generation model. The reporting model is prompted to summarize, re-word, or otherwise transform the answer into a natural language format that is easier to read. Returning the answer thus includes returning the natural language answer.

As indicated above with respect to Step 200, receiving the training dataset may include automatically generating the training dataset. The method of generating the training dataset (which may be referred to as a synthetic training dataset) may include generating the number of predetermined instance data structures in the domain-specific language. Then, the method includes generating, by a language model, the number of predetermined natural language queries from the number of predetermined instance data structures.

In other words, the method of generating the training dataset is the reverse of the normal procedure for generating synthetic data. In most cases, the desired conversion is generated for multiple natural language query examples. However, in one or more embodiments, the instance data structures are generated first. Then, a model may be used to transform the instance data structures into predetermined natural language queries. The process of starting with an instance data structure and then generating the natural language query is easier and more accurate than attempting to generate correct instance data structures from predetermined natural language queries.

The method of generating the training dataset also may include generating the number of predetermined instance data structures from raw data using a Monte Carlo method. For any new dataset (or primary entity), a flattened single-table schema(S) may be generated, which may include the following columns:
- attributes of primary entity,
- line-item attributes of primary entity,
- attributes of linked entities,
- attributes of line-item level linked entities, and
- domain-specific derived attributes/metrics/KPIs, which are created via custom computation on one or more columns.

EXAMPLES $$\text{invoice\_age} = \text{today} - \text{transaction\_date} \tag{1}$$

$$\text{unpaid\_invoice} = (\text{open\_balance} > 0) \tag{2}$$

$$\text{payment\_days} = \text{paid\_date} - \text{transaction\_date} \tag{3}$$

The derived attributes, metrics, and key performance indicators may be defined manually, since derived values may encode some of the domain knowledge about the primary entity.

Next, a random subset of valid payloads may be automatically generated from a dataset schema in reporting from all possible payloads. Automated Checks for ensuring that a generated payload is valid may be performed. The checks may be used for filtering the payloads.

Each payload may be summarized or described by a language model (e.g., CHATGPT4® by Open AI). The summary or description is then converted into a question using a language model, possibly the same language model.

After one natural language query is generated for a given instance data structure, variations of the natural language query may also be generated using a language model, possibly the same language model. In this manner, each predetermined instance data structure may be associated with multiple predetermined natural language queries.

Details of the Monte Carlo method are now provided, by way of example, for generating a templatized instance data structure on a flattened schema. First, an instance data structure may be initialized. An example of an initialized instance data structure may be, "{"function_name": "<primary_entity>", "attributes": {".

Then, a command is given to server the controller to sample a number of filters n1~poisson (k1).

Next, a subroutine for sampling the instance data structures is performed. The subroutine includes sampling a column C~random.choice(S). The subroutine also includes assigning higher probabilities to more popular attributes. If C is a date column with macro support, add a filter to the instance data structure: "C": {"macroName":"<macroValue>"}. If C is a date column without macro support, then add a filter to the instance data structure: "C": {<date_filter>}, where <date_filter> is picked from a list of {<date_filter>,<natural_language_description>} pairs. If C is a numerical column, then a comparison operator <op> is sampled. Then add a filter to the instance data structure: {"C": {"<op>": <value>}}, where <op> could be LESS_THAN, GREATER_THAN, EQUALS, etc. If C is a string column, then add another filter to the instance data structure: "C": <value>.

Returning to the Monte Carlo method, the method then includes sampling a number of groupby n2~poisson (k2). Then, sample n2 string columns (C1, . . . , Cn2)~random.choice(S), and add to the instance data structure the following: "groupby": [C1, . . . , Cn2]. Then, sample number of aggregation n3~poisson (k3).

A second subroutine is then repeated n3 times. The second subroutine includes sampling a numerical column C~random.choice(S). The second subroutine also includes sampling an aggregation function F (sum, count, average, etc.) The second subroutine also includes adding to the instance data structure: "Aggregation": {<C>: <F>}.

Next, the Monte Carlo method includes sample sorting column C~random.choice(S) and sort direction D from {asc, desc} and limit x. Then, add to the instance data structure the following: "sortby": {<C>: <D>}, "limit": <x>.

Next, the Monte Carlo method includes a sample post processing method with parameter M from a set of possible methods like {None, Trend, comparison, benchmark, contribution, causal driver etc}. Then, the following is added to instance data structure: "Insights": {M}.

Next, the Monte Carlo method includes using a language model to convert the generated templatized instance data structure ("IR," or "intermediate representation") to the corresponding natural language question, Q. The templatized {Q: IR} pair then may be varied by commanding a language model to generate variations on the question, Q, (i.e., Q1, Q2, . . . , etc.) for the same instance data structure "IR."

Finally, the Monte Carlo method includes filling in the values sampled from a context (a source of data) in the templatized {Q: IR} pairs. The result is the training dataset.

While the various steps in the flowchart of FIG. 2 are presented and described sequentially, at least some of the steps may be executed in different orders, may be combined or omitted, and at least some of the steps may be executed in parallel. Furthermore, the steps may be performed actively or passively.

Figure 3A:
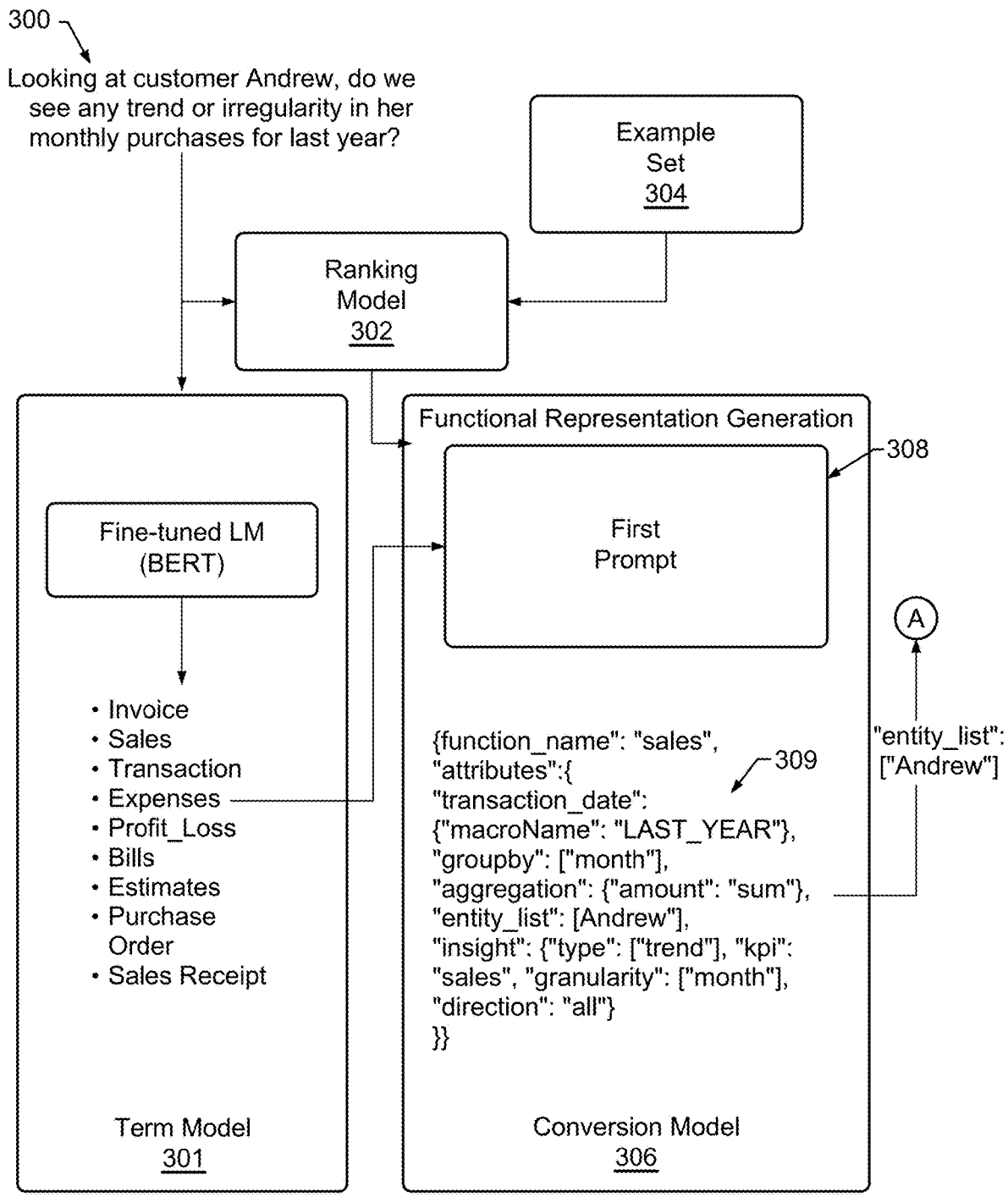
FIG. 3A, FIG. 3B, and FIG. 3C show an example of a method for converting queries to an improved programming language, in accordance with one or more embodiments.
Figure 3B:
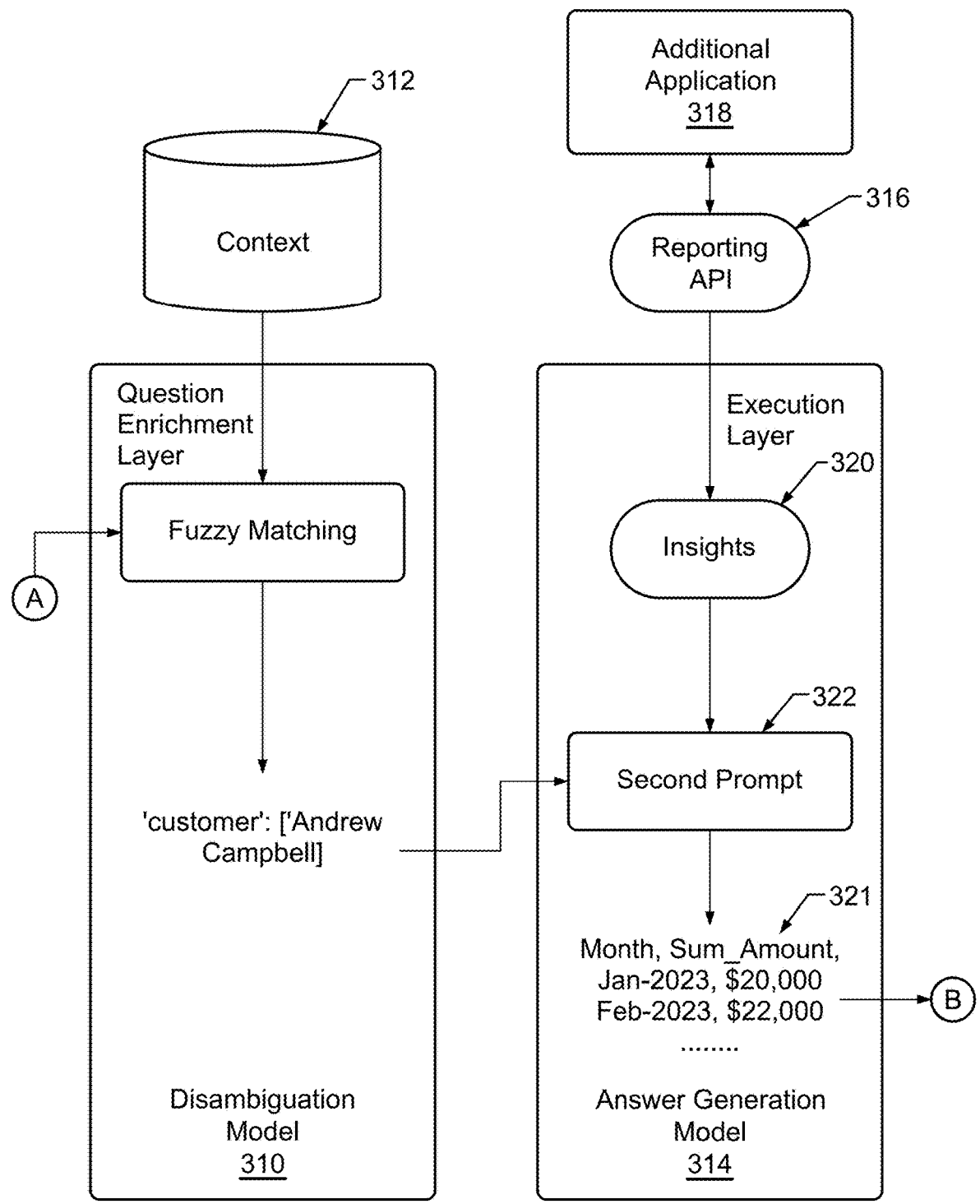
Figure 3C:
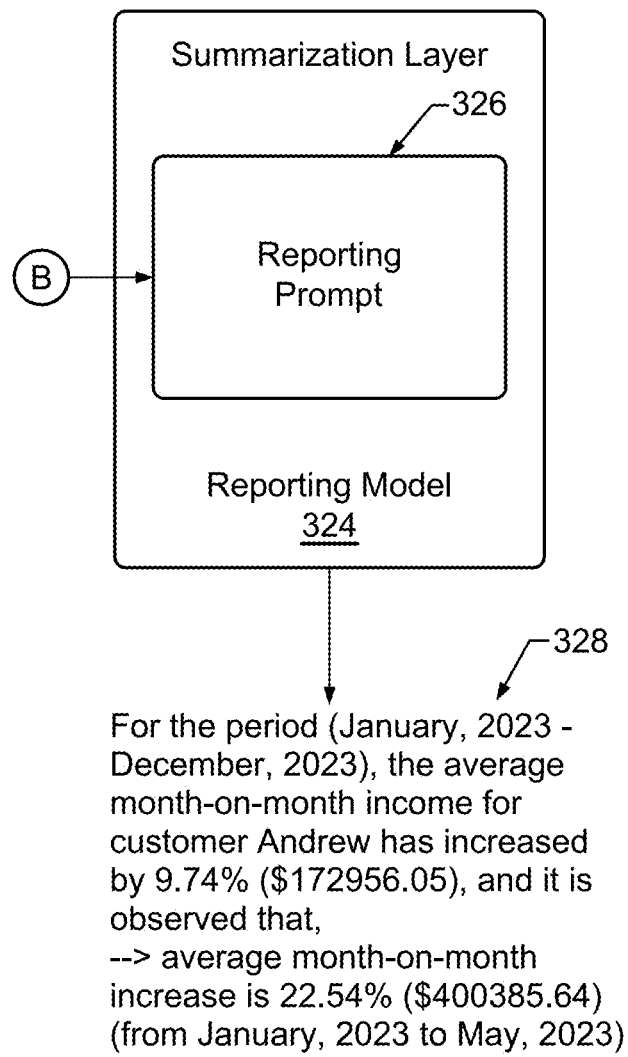

FIG. 3A, FIG. 3B, and FIG. 3C show an example of a method for converting queries to an improved programming language, in accordance with one or more embodiments. FIG. 3A through FIG. 3C should be considered together as a whole. The following example is for explanatory purposes only and not intended to limit the scope of one or more embodiments. The pictorial method shown in FIG. 3A through FIG. 3C may be a variation of the method shown in FIG. 2.

Referring to FIG. 3A, a new natural language query (300) is received from a user. The new natural language query (300) is provided as input to a term model (301). The term model (301) parses the new natural language query (300) into a number of terms.

The new natural language query (300) is also provided as input to a ranking model (302). The ranking model (302) is trained (see, e.g., FIG. 1B and FIG. 2) to select a subset of examples from an example set (304). The subset of examples is inserted into a first prompt (308) to a conversion model (306).

In addition, the first prompt (308) includes the terms generated by the term model (301). The first prompt (308) also includes a command to generate a new instance data structure that corresponds to the new natural language query (300). The first prompt (308) also may include the new natural language query (300).

Once the first prompt (308) is completed, the conversion model (306) is executed on the first prompt (308). The output of the model is a new instance data structure (309). The new instance data structure (309) is a representation of the new natural language query (300) in the domain-specific language described with respect to FIG. 1A.

The new instance data structure (309) may be provided to a disambiguation model (310), as shown in FIG. 3B. The disambiguation model (310) may identify ambiguous terms in the new instance data structure (309). The disambiguation model (310) may use a context (312) to disambiguate the ambiguous terms.

The modified new instance data structure (309) then is inserted into a second prompt (322) for an answer generation model (314). In an embodiment, the server controller may call, via a reporting API (316), an additional application (318) to generate one or more insights (320) that may be inserted into the second prompt (322).

Once completed, the answer generation model (314) is executed on the second prompt (322). The output of the answer generation model (314) is a data structure file (321). The data structure file (321) may be the answer.

However, in an embodiment, the data structure file (321) may be in a format that is not easily understandable by some users. Thus, the data structure file (321) may be provided as input to a reporting model (324), as shown in FIG. 3C. The reporting model (324) may execute on a reporting prompt (326) that instructs the reporting model (324) to summarize, reword, restructure, etc., the data structure file (321).

The output of the reporting model (324) is an answer (328). The answer (328) may be returned to a user, stored, transmitted to another computer process, etc.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 4A:
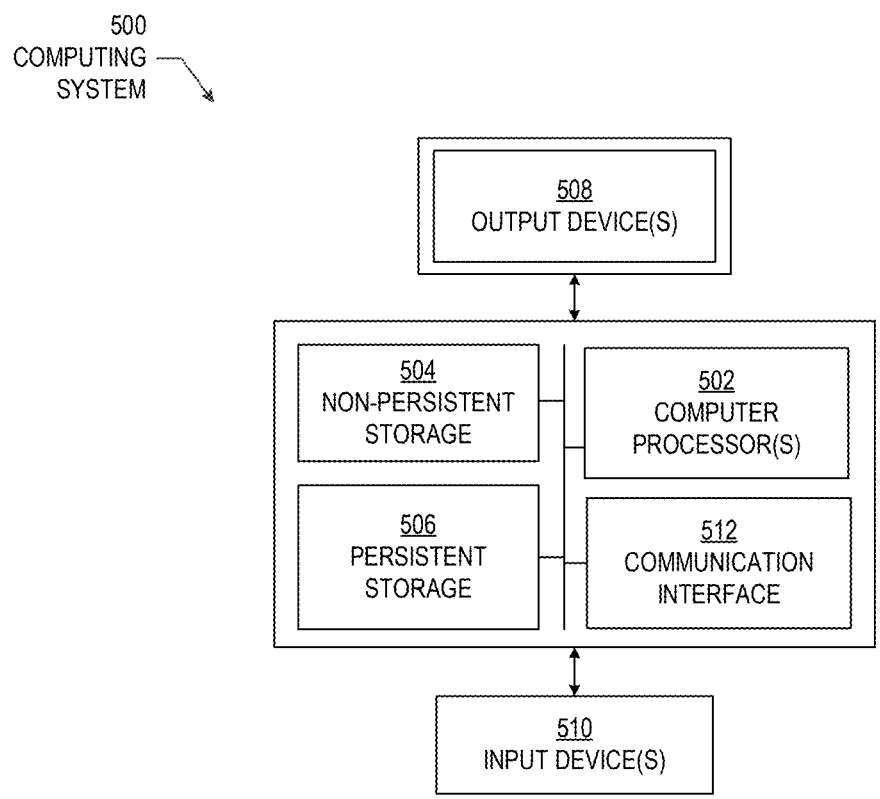
FIG. 4A and FIG. 4B show a computing system and network environment, in accordance with one or more embodiments.

For example, as shown in FIG. 4A, the computing system (400) may include one or more computer processor(s) (402), non-persistent storage device(s) (404), persistent storage device(s) (406), a communication interface (408) (e.g., Bluetooth interface, infrared interface, network interface, optical interface, etc.), and numerous other elements and functionalities that implement the features and elements of the disclosure. The computer processor(s) (402) may be an integrated circuit for processing instructions. The computer processor(s) (402) may be one or more cores, or micro-cores, of a processor. The computer processor(s) (402) includes one or more processors. The computer processor(s) (402) may include a central processing unit (CPU), a graphics processing unit (GPU), a tensor processing unit (TPU), combinations thereof, etc.

The input device(s) (410) may include a touchscreen, keyboard, mouse, microphone, touchpad, electronic pen, or any other type of input device. The input device(s) (410) may receive inputs from a user that are responsive to data and messages presented by the output device(s) (412). The inputs may include text input, audio input, video input, etc., which may be processed and transmitted by the computing system (400) in accordance with one or more embodiments. The communication interface (408) may include an integrated circuit for connecting the computing system (400) to a network (not shown) (e.g., a local area network (LAN), a wide area network (WAN) such as the Internet, mobile network, or any other type of network) or to another device, such as another computing device, and combinations thereof.

Further, the output device(s) (412) may include a display device, a printer, external storage, or any other output device. One or more of the output device(s) (412) may be the same or different from the input device(s) (410). The input device(s) (410) and output device(s) (412) may be locally or remotely connected to the computer processor(s) (402). Many different types of computing systems exist, and the aforementioned input device(s) (410) and output device(s) (412) may take other forms. The output device(s) (412) may display data and messages that are transmitted and received by the computing system (400). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (402), is configured to perform one or more embodiments, which may include transmitting, receiving, presenting, and displaying data and messages described in the other figures of the disclosure.

Figure 4B:
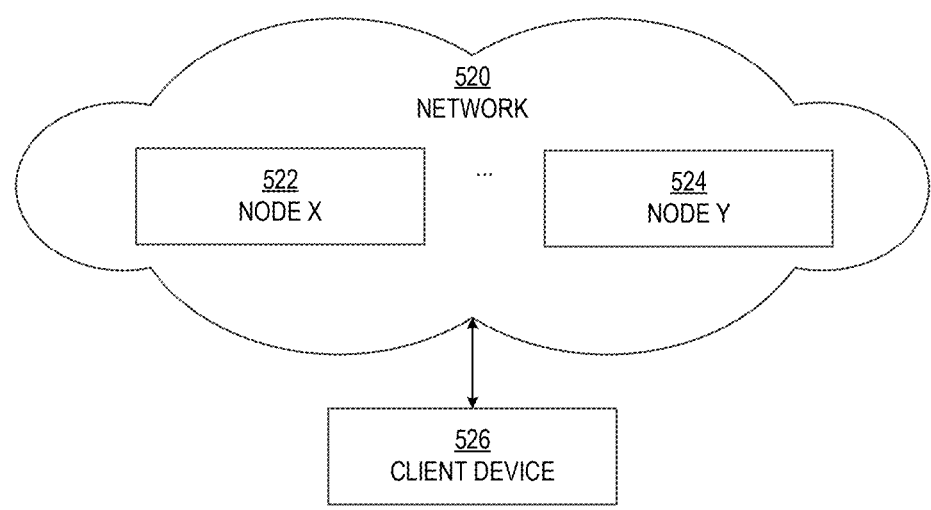

The computing system (400) in FIG. 4A may be connected to, or be a part of, a network. For example, as shown in FIG. 4B, the network (420) may include multiple nodes (e.g., node X (422) and node Y (424), as well as extant intervening nodes between node X (422) and node Y (424)). Each node may correspond to a computing system, such as the computing system shown in FIG. 4A, or a group of nodes combined may correspond to the computing system shown in FIG. 4A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

The nodes (e.g., node X (422) and node Y (424)) in the network (420) may be configured to provide services for a client device (426). The services may include receiving requests and transmitting responses to the client device (426). For example, the nodes may be part of a cloud computing system. The client device (426) may be a computing system, such as the computing system shown in FIG. 4A. Further, the client device (426) may include or perform all or a portion of one or more embodiments.

The computing system of FIG. 4A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
receiving a training dataset comprising:
a plurality of predetermined natural language queries comprising a domain, and
a plurality of predetermined instance data structures storing the plurality of predetermined natural language queries in a domain-specific language corresponding to the domain,
wherein the domain-specific language comprises a plurality of predefined terms representable in a predefined data structure,
wherein each of the plurality of predetermined instance data structures represents a corresponding instance of the predefined data structure, and
each of the plurality of predetermined natural language queries corresponds to one of the plurality of predetermined instance data structures;
training, until convergence, a ranking model on the training dataset using a pairwise ranking loss function that modifies a sequence of layers of the ranking model to maximize a score output by the ranking model,
wherein the score represents a probability that a combination of a given instance data structure in the plurality of predetermined instance data structures and a corresponding natural language query in the plurality of predetermined natural language queries, when inserted into a conversion prompt of a conversion model, increases a performance of the conversion model when converting a new natural language query into a new instance data structure; and
returning, after convergence, the ranking model as a trained ranking model.

2. The method of claim 1, wherein training further comprises:
generating a second prompt that instructs the conversion model to convert a test natural language query into a test instance data structure, wherein:
the second prompt further comprises a training subset of the training dataset, the training subset comprising a subset of the plurality of predetermined natural language queries and a corresponding subset of the plurality of predetermined instance data structures, and
the test natural language query has a corresponding expected instance data structure;
executing the conversion model on the second prompt to generate the test instance data structure;
comparing the test instance data structure to the corresponding expected instance data structure to generate a performance metric of the conversion model; and
updating the pairwise ranking loss function of the ranking model based on the performance metric of the conversion model.

3. The method of claim 2, wherein the pairwise ranking loss function is further based on a combination of the performance metric and a margin hyperparameter of the ranking model.

4. The method of claim 3, wherein:
the test natural language query and corresponding test instance data structure comprise an example, and
the pairwise ranking loss function is further based on a combination of the performance metric, the margin hyperparameter, and the score assigned by the ranking model to the example.

5. The method of claim 3, wherein the margin hyperparameter comprises a setting that controls a distance between different possible predictions of the ranking model.

6. The method of claim 1, wherein the trained ranking model is further trained to output, as a plurality of examples, a subset of the plurality of predetermined instance data structures and a corresponding subset of the plurality of predetermined natural language queries having corresponding scores above a threshold score, wherein the corresponding scores are instances of the score.

7. The method of claim 6, wherein the trained ranking model is further trained to output a maximum number of the plurality of examples.

8. The method of claim 6, further comprising:
receiving a new natural language query;
generating the first prompt that instructs the conversion model to convert the new natural language query into a new instance data structure in the domain-specific language;
generating a second prompt that instructs the ranking model to select, from among the plurality of predetermined instance data structures and the plurality of predetermined natural language queries, at least one example comprising at least one of the plurality of the plurality of predetermined instance data structures and a corresponding at least one of the plurality of predetermined natural language queries;
executing the ranking model on the second prompt to output the at least one example;
inserting the at least one example in the first prompt to generate a few-shot prompt;
executing the conversion model on the few-shot prompt to generate the new instance data structure; and
returning the new instance data structure.

9. The method of claim 8, further comprising:
generating an answer prompt that instructs an answer generation model to generate an answer to the new natural language query, wherein the answer prompt further comprises the new instance data structure;
executing the answer generation model on the answer prompt to generate an answer; and
returning the answer to a user device.

10. The method of claim 9, further comprising:
disambiguating, prior to generating the answer prompt, the new instance data structure.

11. The method of claim 9, further comprising:
executing, prior to returning the answer, a reporting model on the answer to generate a natural language answer, wherein returning the answer comprises returning the natural language answer.

12. The method of claim 1, further comprising generating the training dataset by:
generating the plurality of predetermined instance data structures in the domain-specific language; and
generating, by a language model, the plurality of predetermined natural language queries from the plurality of predetermined instance data structures.

13. The method of claim 12, further comprising:
generating the plurality of predetermined instance data structures from raw data using a Monte Carlo method.

14. A system comprising:
a computer processor;
a data repository in communication with the computer processor and storing:
  a training dataset comprising:
    a plurality of predetermined natural language queries comprising a domain, and
    a plurality of predetermined instance data structures storing the plurality of predetermined natural language queries in a domain-specific language corresponding to the domain,
      wherein the domain-specific language comprises a plurality of predefined terms representable in a predefined data structure,
      wherein each of the plurality of predetermined instance data structures represents a corresponding instance of the predefined data structure, and
      each of the plurality of predetermined natural language queries corresponds to one of the plurality of predetermined instance data structures;
  a score representing a probability that a combination of a given instance data structure in the plurality of predetermined instance data structures and a corresponding natural language query in the plurality of predetermined natural language queries, when inserted into a first prompt of a conversion model, increases a performance of the conversion model when converting a new natural language query into a new instance data structure;
  a ranking model comprising a sequence of layers, wherein the ranking model is executable by the computer processor;
  a training controller comprising a pairwise ranking loss function that modifies a sequence of layers of the ranking model to maximize a score output by the ranking model, wherein the training controller is executable by the computer processor to:
    train, until convergence, the ranking model on the training dataset using the pairwise ranking loss function to modify the sequence of layers of the ranking model to maximize the score output by the ranking model; and
    return, after convergence, the ranking model as a trained ranking model.

15. The system of claim 14,
wherein the system further comprises the conversion model, executable by the computer processor, and
wherein the training controller is further configured to:
  generate the first prompt that instructs the conversion model to convert a test natural language query into a test instance data structure, wherein:
    the first prompt further comprises a training subset of the training dataset, the training subset comprising a subset of the plurality of predetermined natural language queries and a corresponding subset of the plurality of predetermined instance data structures, and
    the test natural language query has a corresponding expected instance data structure;
  execute the conversion model on the first prompt to generate the test instance data structure;
  compare the test instance data structure to the corresponding expected instance data structure to generate a performance metric of the conversion model;
  update the pairwise ranking loss function of the ranking model based on a combination of the performance metric of the conversion model, a performance metric, and a margin hyperparameter of the ranking model.

16. The system of claim 15, wherein:
the test natural language query and corresponding test instance data structure comprise an example, and
the pairwise ranking loss function is further based on a combination of the performance metric, the margin hyperparameter, and the score assigned by the ranking model to the example.

17. The system of claim 15, wherein the margin hyperparameter comprises a setting that controls a distance between different possible predictions of the ranking model.

18. The system of claim 14, wherein:
the trained ranking model is further trained to output, as a plurality of examples, a subset of the plurality of predetermined instance data structures and a corresponding subset of the plurality of predetermined natural language queries having corresponding scores above a threshold score,
the corresponding scores are instances of the score, and
the trained ranking model is further trained to output a maximum number of the plurality of examples.

19. A method comprising:
receiving a training dataset comprising:
  a plurality of predetermined natural language queries comprising a domain, and
  a plurality of predetermined instance data structures storing the plurality of predetermined natural language queries in a domain-specific language corresponding to the domain, and
    wherein the domain-specific language comprises a plurality of predefined terms representable in a predefined data structure,
    wherein each of the plurality of predetermined instance data structures represents a corresponding instance of the predefined data structure,
  each of the plurality of predetermined natural language queries corresponds to one of the plurality of predetermined instance data structures;
training, until convergence, a ranking model on the training dataset using a pairwise ranking loss function that modifies a sequence of layers of the ranking model to maximize a score output by the ranking model, wherein:
  the score represents a probability that a combination of a given instance data structure in the plurality of predetermined instance data structures and a corresponding natural language query in the plurality of predetermined natural language queries, when inserted into a first prompt of a conversion model, increases a performance of the conversion model when converting a new natural language query into a new instance data structure, and
training further comprises:
generating the first prompt that instructs the conversion model to convert a test natural language query into a test instance data structure, wherein:
the first prompt further comprises a randomly selected subset of the training data comprising a subset of the plurality of predetermined natural language queries and a corresponding subset of the plurality of predetermined instance data structures, and
the test natural language query has a corresponding expected instance data structure;
executing the conversion model on the first prompt to generate the test instance data structure;
comparing the test instance data structure to the corresponding expected instance data structure to generate a performance metric of the conversion model; and
updating the pairwise ranking loss function of the ranking model based on the performance metric of the conversion model; and
returning, after convergence, the ranking model as a trained ranking model.

20. The method of claim 19, wherein:
the test natural language query and corresponding test instance data structure comprise an example,
the pairwise ranking loss function is further based on a combination of the performance metric, a margin hyperparameter, and the score assigned by the ranking model to the example,
the trained ranking model is further trained to output, as a plurality of examples, a subset of the plurality of predetermined instance data structures and a corresponding subset of the plurality of predetermined natural language queries having corresponding scores above a threshold score, wherein the corresponding scores are instances of the score, and
the trained ranking model is further trained to output a maximum number of the plurality of examples.

* * * * *